March 24, 1931.  F. J. BLESI  1,797,753
CANDY MACHINE
Filed May 11, 1925  2 Sheets-Sheet 1
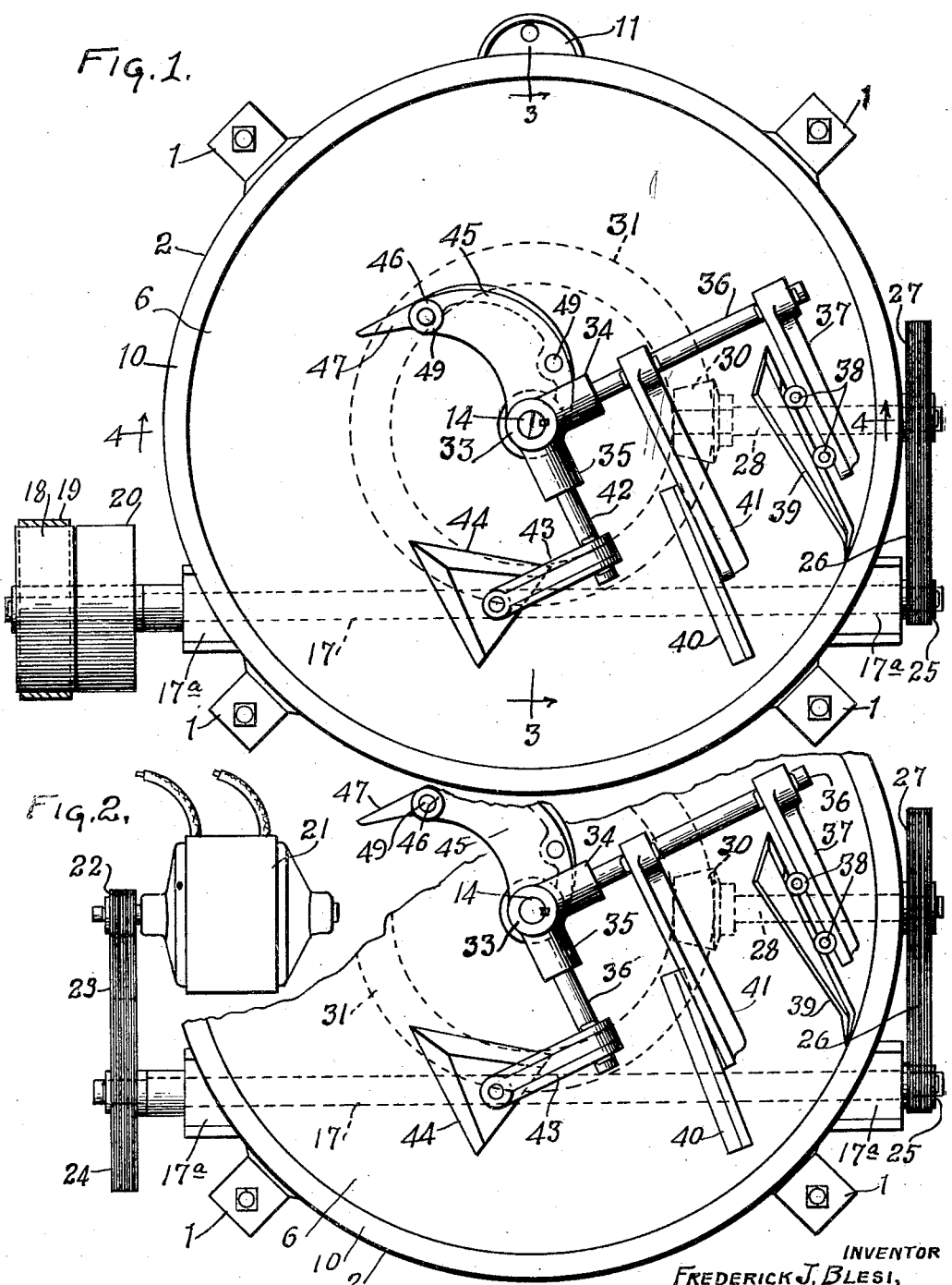
INVENTOR
FREDERICK J. BLESI,
By Toulmin & Toulmin
ATTORNEYS

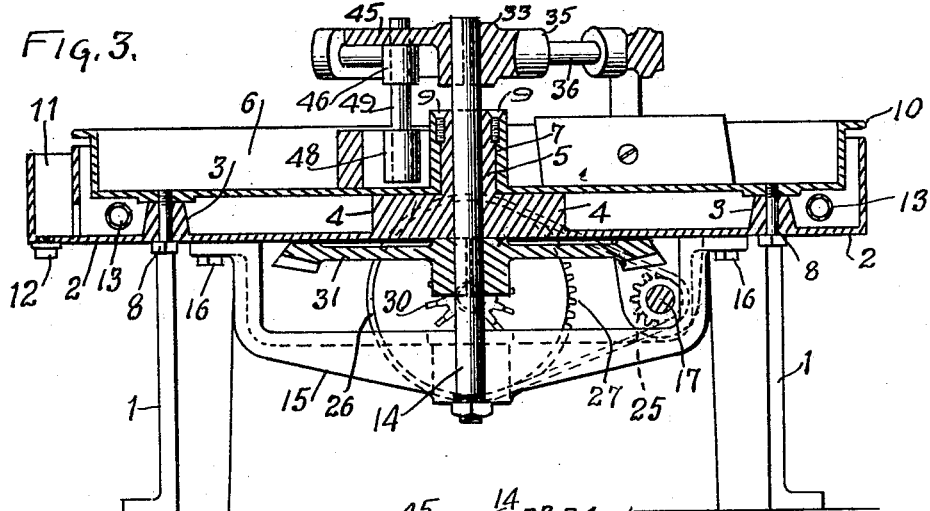
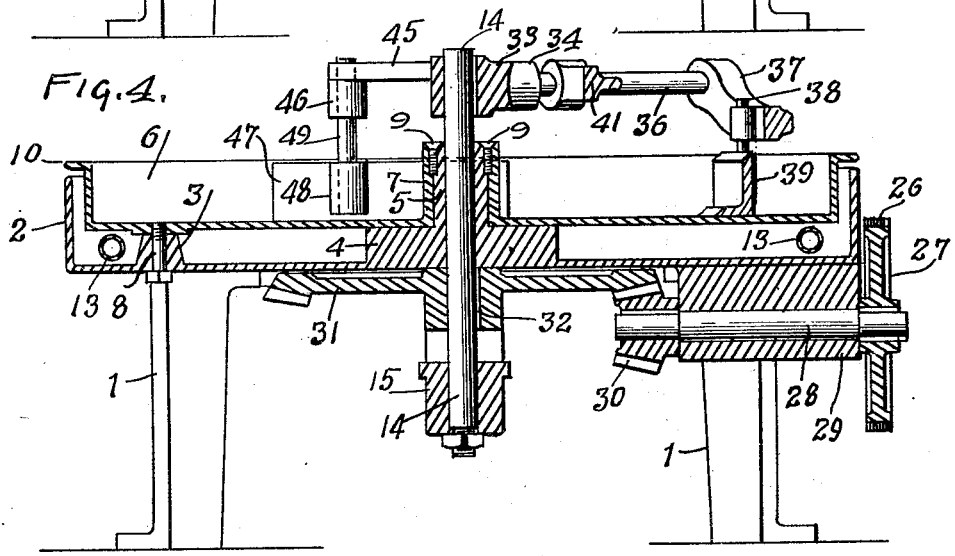

Patented Mar. 24, 1931

1,797,753

UNITED STATES PATENT OFFICE

FREDERICK J. BLESI, OF DAYTON, OHIO, ASSIGNOR TO DAYTON SPECIALTY MACHINE COMPANY, OF DAYTON, OHIO, A COPARTNERSHIP

CANDY MACHINE

Application filed May 11, 1925. Serial No. 29,407.

This invention relates to machines used in making candy and more particularly to what are known as cream beaters and coolers which act on a batch of candy ingredients previously cooked, until it is changed into a creamy consistency known as fondant or other cream fillers for candy.

The object of the present invention is to provide operating mechanism for such a machine which will be efficient and durable and overcome the delay and expense incident to the breakage of such mechanism.

To this end, my improvements consist of a driving shaft mounted on the machine and extending essentially from one side to the other and adapted at one end to receive power from a high speed motor and at the other end to deliver such motion, and a driven shaft combined with the driving shaft and connected thereto, to receive such delivered motion and provided with a bevel pinion and a bevel gear wheel secured to the stirrer-shaft of the machine, whereby I transmit high rotary speed to the stirrer-shaft through means which apply such power in continuous rotary directions in a direct manner, all to the end of enabling the stirrers or beaters in my machine to readily start up and assume rotary motion without delay or breakage when the power is applied, irrespective of the weight or inertia of the mass to be stirred.

In the accompanying drawings:—

Figure 1 is a top plan view of a candy cream beating and cooling machine embodying my invention.

Figure 2 is a view similar to Figure 1, illustrating another form of power drive.

Figure 3 is a section taken on the line 3—3 of Figure 1 and looking in the direction of the arrows; and Figure 4 is a section taken on the line 4—4 of Figure 1 and looking in the direction of the arrows.

In these drawings the reference numeral 1 designates standards or supports on which is mounted a pan or receptacle 2, having lugs 3 and a boss 4 with openings therein for the purpose hereinafter stated. The boss 4 has a collar 5. A receptacle or candy trough 6 rests on the lugs 3 and boss 4. This trough has a collar 7 and is held in position relatively to the pan 2 by screw bolts 8 passing through the holes in the lugs 3 and extending into lugs on the under side of the trough 6. A series of machine screws 9 also aid in holding the trough 6 in position. A flange 10 on the edge of the trough 6 extends out even with the sides of the receptacle 2. It will thus be seen that when the trough 6 is positioned in the pan 2, a space is provided between the two receptacles adapted to contain water or any other medium for regulating the temperature of the contents of the candy receptacle 6. The cooling medium may be supplied to the pan 2 by means of a spout 11 and when desired may be drained out through an opening provided with a plug 12.

It is sometimes desirable to raise the temperature of the water or other medium in the space between the receptacles 2 and 6 and to that end, pipes 13 are provided for the introduction of steam. A shaft 14 which I will term the stirrer-shaft, because the beaters or stirrers are mounted thereon, extends through the boss 4 and collar 5 and is supported at one end by a bracket 15 secured to the receptacle 2 in any suitable manner as shown at 16. This shaft 14 is driven by the following instrumentalities:—A driving shaft 17 is mounted in bearings 17a carried by the machine. This driving shaft is extended from one side of the machine to the other, as seen in Figure 1. It may receive rotary motion by means of a fixed pulley 18 and a belt 19, the latter shiftable from a loose pulley 20 and driven from any suitable source, or by an electric motor 21 of conventional construction. The shaft of the motor 21 is equipped with a sprocket pinion 22 adapted to drive a silent chain 23 mounted on a sprocket wheel 24 secured to the driving shaft 17. The speed of such a motor will usually be about 1750 revolutions per minute, while the speed of the driving shaft 17 will be approximately 350 revolutions per minute. This shaft, as stated, is made to extend across the machine so that at one end it can thus receive power and at the other end can readily deliver that power through a sprocket pinion 25 and a silent chain 26 to a sprocket wheel 27. The latter is mounted on a driven shaft 28 having an elongated bearing 29, as seen in Figure 4. The speed of this shaft will be approximately 70 revolutions per minute when the speed of the driving shaft is 350 revolutions. The driven shaft is equipped with a bevel pinion 30 adapted to smoothly and readily mesh with a bevel gear wheel 31, the latter mounted on the stirrer-shaft 14 and secured thereto as by a key 32.

It will now be seen that by this power transmitting mechanism here described, the motion is continuously transmitted from the source of power to the stirrer-shaft 14 by devices which all travel in uninterrupted rotary directions and without any indirect application of the power from point to point. Again, by means of positioning the driving shaft 17 so as to extend from one side to the other of the general machine, I am enabled to apply power to that shaft at one side of the apparatus and to take it off on the other side where its speed or motion is reduced in its application to the driven shaft, the pinion on the latter shaft further reducing the speed but amplifying the power by reason of the enlarged diameter of the bevel gear which slowing but powerfully rotates the stirrer shaft.

Referring now to the beating mechanism, it will be noted that it is comprised of a plurality of different shaped blades which beat, divide, roll and turn over the batch from the sides of the machine toward the center and from the center towards the sides until the batch has been brought to the proper creamy consistency. The blades also operate on and keep clean the bottom and sides of the candy receptacle 6 and thereby facilitate the ready removal of the batch.

Mounted on the upper end of the stirrer-shaft 14 and keyed thereto is a hub 33 having sleeves 34 and 35. Mounted in the sleeve 34 is a shaft 36 carrying a bracket 37 near one end thereof. Mounted on this bracket by supporting rods 38 is a blade or paddle 39 which may be adjustable if desired. From the drawing it will be noted that this blade is so located that it will prevent the batch from clinging to the sides and bottom of the trough and tend to move it inward in a vertically rolling condition. A blade 40 secured to a bracket 41 also carried by the shaft 36 further tends to move the batch toward the center and give it a horizontal rolling movement. Extending from the sleeve 35 is a shaft 42 having secured thereto a bracket 43 carrying a dividing blade 44. It is the purpose of this blade to divide the batch, forcing one part toward the center and the other toward the sides of the pan, each part having a horizontal rolling movement, which parts are then acted on by the other blades to effect a complete stirring or working of the batch. The hub 33 has projecting therefrom a bracket 45 having a boss 46 and adapted to carry a blade 47, also having a boss 48, a connecting rod 49 passing through the bosses 46 and 48 and bracket 45 and held in position in any suitable manner. Blade 47 gives the batch a vertical rolling movement from the center of the trough toward the outer edge thereof.

The different shapes of the several blades and the particular arrangement of the same with respect to one another and to the candy receptacle 6 results in all parts of the batch being worked on so that the resulting product will be of the same creamy consistency throughout. It is also essential that the batch should be maintained at a certain temperature during the beating process and this is taken care of by the heating and cooling medium introduced into the space between the upper and lower receptacles.

Having thus fully described my invention, what I claim as new and desire to secure by Letters Patent of the United States is:—

1. In a mixing machine for candy, a circular trough, a rotating shaft extending in said trough, an arm extending from said shaft, a plurality of means on said arm tending to move the contents of the trough to the center, each giving the candy a different rolling movement, a second arm extending from said shaft and tending to move the contents of the trough toward and from the center, and means tending to move the contents of the trough from the center operated by said shaft.

2. In a mixing machine for candy, a circular trough, means adjacent the outer edge of the trough tending to move the contents of the trough toward the center, means remote from the outer edge of the trough tending to move the contents of the trough toward the center, means located near the center of the trough for moving the contents of the trough from the center, a divider acting to move the contents in both directions and to give said contents a horizontal rolling movement, and a common actuating means for all of said means.

3. In a mixing machine for candy, a circular trough, a vertical shaft extending into said trough, an arm extending from said shaft, a plurality of means on said arm tending to move the contents of the trough to the center, each giving the candy a different rolling movement, a second arm extending from said shaft and tending to move the contents of the trough from the center, a third arm extending from said shaft and having means thereon to give the candy a rolling movement to and from the center of the trough, and means for rotating said vertical shaft including a driven shaft operatively connected to said vertical shaft, a driving shaft, a motor shaft, and noiseless sprocket chain connections between said last named shafts, whereby the vertical shaft is rotated by said motor.

In testimony whereof, I affix my signature.

FREDERICK J. BLESI.